Feb. 2, 1954     P. A. PERILHOU     2,668,288

DISTANCE MEASURING DEVICE

Filed Sept. 22, 1948     5 Sheets—Sheet 1

Inventor:-
PIERRE ANDRÉ PERILHOU
by Brown & Leward
Attorneys

Feb. 2, 1954   P. A. PERILHOU   2,668,288
DISTANCE MEASURING DEVICE
Filed Sept. 22, 1948   5 Sheets-Sheet 3

Inventor:
PIERRE ANDRE' PERILHOU
By Brown & Heward
Attorneys

Inventor:
PIERRE ANDRÉ PERILHOU
by Brown & Oswald
Attorneys

Patented Feb. 2, 1954

2,668,288

UNITED STATES PATENT OFFICE 2,668,288

DISTANCE MEASURING DEVICE

Pierre André Perilhou, Clamart, France, assignor to Office National d'Etudes et de Recherches Aeronautiques, Paris, France, a company of France Application September 22, 1948, Serial No. 50,515

Claims priority, application France September 23, 1947

21 Claims. (Cl. 343—112)

This invention relates to distance measuring equipment and more particularly to systems permitting to determine a distance between two points with the aid of radiant or wave energy.

An object of the invention is to provide a novel method and means for distance measurement based on the use of radiant or wave energy which is caused to be transmitted from one point and is caused to be received at another point, on at least two spaced and independent aerials and in which the effects of reception of said energy by said aerials are used for giving a desired measure of distance.

More particularly, the invention has for its object a novel method for distance measurement or determination which method consists in producing at a location and namely the one with respect to which a distance is to be determined, wave energy radiations presenting a characteristic variable with distance when received at two spaced points, in receiving said radiations at another location and namely the one the spacing of which with respect to the first location is to be determined on at least two spaced and independent receiving aerials and in using the signals thus received by said two aerials to show a variation of said variable characteristic of said radiations as the same are received by one and the other of said aerials.

Another object of the invention is to provide a novel method for distance measurement or determination which consists in producing at a location and namely the one with respect to which a distance is to be determined, wave energy radiations presenting a characteristic variable with time, in receiving said radiations at another location and namely the one, the spacing of which with respect to the first location is to be determined, on at least two spaced and independent receiving aerials and in using the signals thus received by said aerials so as to show a variation of said variable characteristic of said radiations depending on the reception of said radiations by one and the other of said aerials.

Another object of the invention is to provide a method and system for distance measurement of the type specified above in which the signals received by the receiving aerials are compared in relation to time to produce a desired indication of distance.

Another object of the invention is to provide a method and system for distance measurement of the type specified above in which the signals received by the receiving aerials are combined to produce a desired indication of distance.

Another object of the invention is to provide a novel method and means for determining a distance between two points, which method involves the use of two spaced and electrically independent receiving aerials which may be connected either respectively to two separate receivers or alternately to a single receiver, the signals corresponding to each of said aerials being compared in relation to time for giving a desired measure of distance.

A still further object of the invention is to provide a novel method and means of the kind specified above making use of ultrashort or very high frequency radiations for which the spacing between the receiving aerials is relatively great in comparison with the wavelength of said radiations.

A more particular object of the invention concerns the application of the specified method to navigation of dirigible crafts whether aerial or naval, in which two receiving aerials form a part of distance measuring equipment carried by the craft and constitute on said craft a distance measuring base line permitting to determine the distance of the craft with respect to a desired point provided with a radiant energy transmitting equipment adapted to produce a rotating beam of radiant energy.

A still further object of the invention concerns a particular embodiment of the specified method and system comprising the use of a rotating beam of radiant energy located at one point and of two independent receiving aerials spaced apart and forming a distance measuring base line at another point, these receiving aerials being associated with one or two suitable receivers permitting to compare in relation to time two equivalent phases of reception of the rotating beam by each of said aerials.

The invention contemplates furthermore another variation of the specified method permitting to obtain a measure of distance, for instance between a rotating radio beacon or the like and a dirigible craft independently of the orientation of the distance measuring base line carried by the craft with respect to the direction joining the point of location of said craft with the point of location of the radio beacon.

In this particular embodiment of the invention, the dirigible craft is provided according to the invention with four receiving aerials located at the extremities of two distance measuring base lines at right angles and the measure of distance is obtained by combining the effects of reception of said four aerials taken by pairs.

In accordance with a particular feature of the invention, the measure of distance in the above last mentioned case is obtained by measuring the angles of parallax with respect to the point to which the distance is to be measured, of the two distance measuring base lines at right angles constituted by four aerials taken two by two, this measure being expressed in values of electrical voltages which are combined thereafter for giving the angle of parallax for a base line of the same length placed at the considered point of reception, perpendicularly to the line passing through said point and the point of transmission of radiant energy.

A still further object of the invention is to provide a system of distance measurement operating in accordance with the method of the type specified, in which means are provided permitting to render a current or voltage used for indication, variable with distance in such a manner that this current or voltage passes through a zero value for a predeterminate distance to a transmitter and namely a transmitter of a rotating beam of radiant energy, which distance in case of application of the invention to the blind landing of aircraft may be the distance corresponding to a desired point on a runway whereby any possible misadjustment or trouble in the circuits of direct current used in such a system may be eliminated.

Another object of the invention is to provide a system of distance measurement of the type referred to above in which the indicating current is made variable with distance according to a hyperbolic relation such that this current takes at the limit, with the distance increasing infinitely, a finite and predetermined value.

This latter object of the invention is attained by using the signal produced by one of the receiving aerials for triggering a multivibrator producing a signal of a rectangular form the duration of which corresponds to the time interval required for the rotating beam to pass from one to the other of the two aerials at a predeterminate distance, by deriving from said rectangular signal a pulse corresponding to its rear or trailing edge and by causing said pulse to act simultaneously with the signal produced by the other aerial upon an Eccles-Jordan network whereby the output current of the assembly is given a form variable as a function of the distance or an average voltage defined by the relation $$e = a \times \frac{D-1}{D}$$

in which D is the distance between the receiving base line formed by two aerials and the transmitter 1 is the distance for which the current takes a zero value and $a$ is the coefficient which determines the value of the current at the limit, when D increases infinitely.

Another object of the invention concerns the provision of a novel method and system for measuring a distance between two points comprising the use at one of said points of two transmitting aerials producing synchronously related variable characteristic radiations and at the other point, two spaced and independent receiving aerials forming, as previously mentioned, a distance measuring base line and in which said measure of distance is obtained by combining the differences of said variable characteristic of transmitted radiations as the same are received by each receiving aerial from both transmitters simultaneously, each of said variable characteristic differences being a function of the distance of said transmitting aerials to the middle point of the receiving base line formed by said receiving aerials, when this base line is oriented perpendicularly and is symmetrical to the central axis of the transmitting base line formed by said two transmitters or transmitting aerials.

According to another feature of the invention, there is provided a novel method and system for measuring a distance between two points comprising the use at one of said points of two transmitting aerials producing synchronously related frequency modulated radiations and at another point, two spaced and electrically independent receiving aerials forming, as previously mentioned, a distance measuring base line and in which said measure of distance is obtained by a summation of differences of frequencies received simultaneously by each aerial from both transmitters, each of said frequency differences being a function of the distance of the transmitting aerials to the middle point of the receiving base line formed by said two receiving aerials when this line is oriented perpendicularly to and is placed symmetrically with respect to the central axis of the transmitting base line formed by the two transmitting aerials.

The invention as defined in the two preceding paragraphs is preferably reduced to practice by the use of ultra-short or very high frequency radiations for which the spacing between two receiving aerials is relatively great when compared to the wave length of said radiations. Also, in this case, it is applicable more particularly to navigation of dirigible crafts such as air or marine crafts.

The above and other object and features of the invention will appear more fully hereinafter from the following detailed description and the accompanying drawings showing by way of example certain preferred embodiments of the invention, it being understood that these drawings are given for the purpose of illustration only and are not to be considered as limiting in any way this invention.

Figure 1:
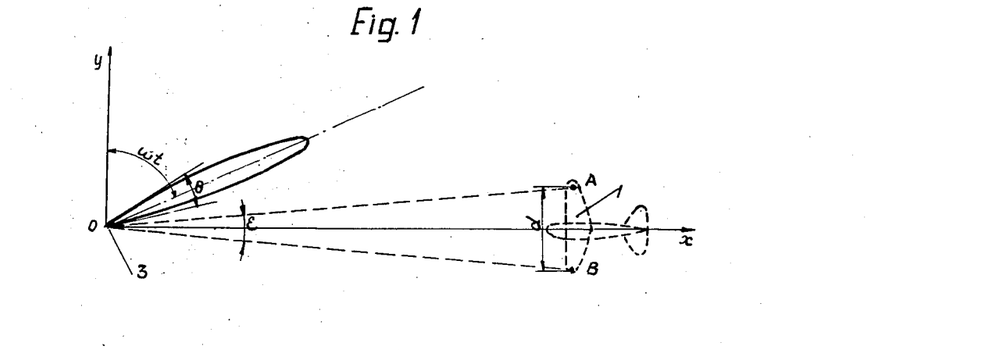
Fig. 1 is a schematic representation of the first embodiment of the method according to the invention applied to the measure of a distance between a dirigible craft such as an aircraft and a point of its destination which may be provided with a rotating radio beacon.

Referring now to the drawings for a detailed description of the invention, it will be noted that Figs. 1 to 5 relate to the first embodiment of the method according to the invention. As shown in Fig. 1 there is provided at point O which may be for instance a point of destination of an aircraft 1, an ultra high frequency transmitter feeding a directive aerial of high concentration (not indicated). This aerial may be constituted by a pavillon, a parabolic mirror or a cylindrico-parabolic reflector, etc. The horizontal directivity of such an aerial will be preferably as great as possible, i. e. the aerial should be relatively wide. In the vertical plane, the directivity of this aerial will be less pronounced especially in the case of application of the method according to the invention to the navigation of aircrafts such as airplanes for instance, this for the purpose of reaching aircrafts at very different heights.

The angle of opening or divergency of the beam produced by such an aerial, which may be supposed for the purpose of explanation, to be free from lateral lobes, is indicated on Fig. 1 by $\theta$ and will be expressed in degrees. With very short waves, this angle may have a value of a few degrees. This aerial is rotated about a vertical axis passing through point O at a uniform angular speed $\omega$. Accordingly, the space around said point O is regularly swept by the beam of electro-magnetic radiations. When the beam in its rotation passes through the point of location of a receiving aerial such as A, an electromotive force is induced in said aerial and the variation of said electro-motive force in relation to time, is determined by the form of the directivity curve of the transmitting aerial. Such a curve is indicated by way of example on Fig. 2.

Figures 2, 3:
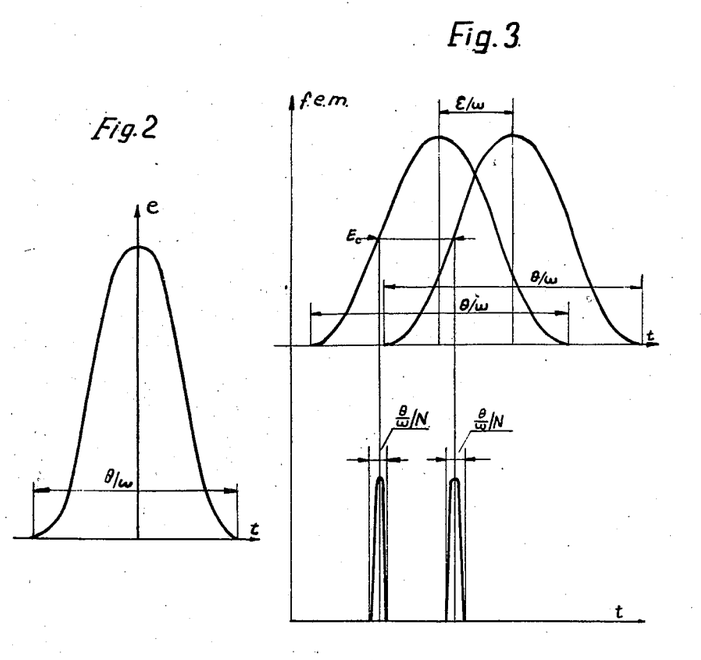
Fig. 2 shows a curve of variation in relation to time of a voltage induced in a receiving aerial by the passage of a rotating beam of radiant energy through the point of location of said aerial.
Fig. 3 shows on a same time base two signal voltage curves induced in two spaced receiving aerials as well as corresponding locally produced pulses for defining in relation to time the relative position of said signal voltages.

If there is provided then a second receiver, the aerial of which is located at point B, such that point O is equally spaced from point A and from point B and that the angle AOB has a certain value $\epsilon$, the envelops of electromotive forces induced in aerials A and B will be represented by two identical curves such as shown in Fig. 3 and which are shifted one from the other in relation to time by a time distance $$\frac{\epsilon}{\omega}$$

If distance AB is known, it is possible to derive from a diagram in which said two envelops curves are plotted against a time base as shown in Fig. 3, the distance D between the receiving base line AB and point O.

In practice, aerials A and B may be provided at the opposite extremities of the wings of an aircraft whereby the same may be oriented following the direction toward the radio beacon O, for instance, by manoeuvring so as to obtain a maximum spacing between the signal received by aerials A and B, or by any other means provided to permit its navigation or orientation for instance during a landing.

The measure of the time lag between the curves of voltages received by the two aerials may be effected by any known method and means and in particular by projecting said curves on a screen of an oscilloscope. The sharpness of the definition may be increased by using the method claimed and described in the copending application Serial No. 48,487, filed on September 9, 1948, according to which each of such signal curves may be positioned in relation to time by a locally produced sharply defined pulse corresponding to a predetermined point of said signal curve having a predetermined relation to the maximum amplitude of the same.

Figures 4, 4A, 5:
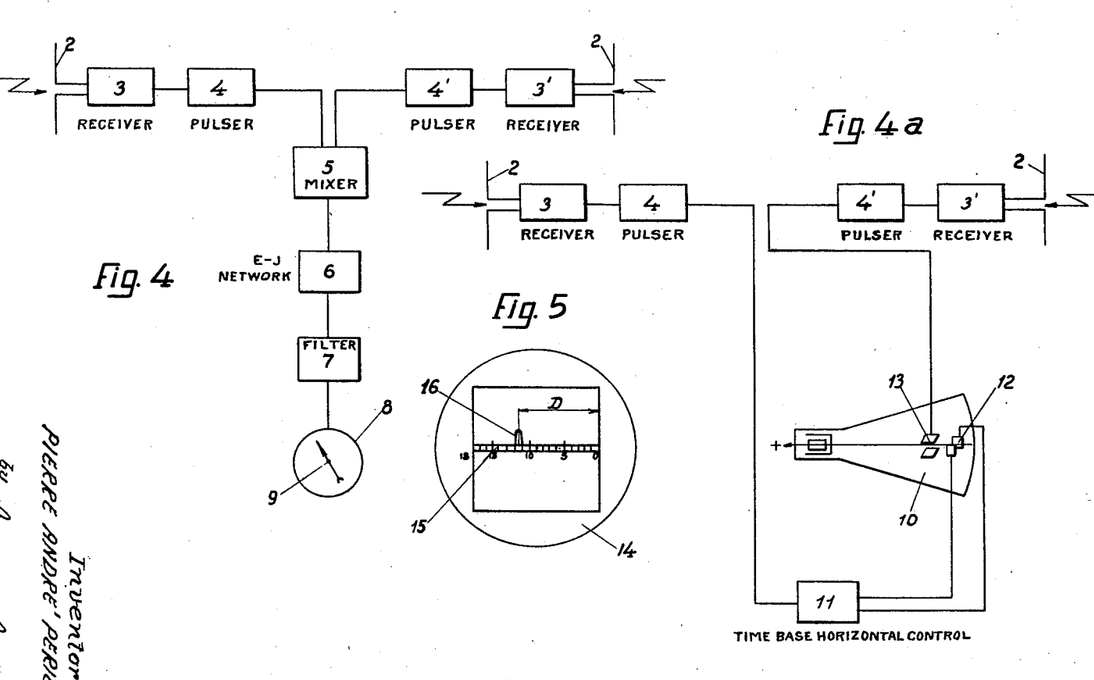
Fig. 4 shows a block diagram of a distance measuring apparatus or equipment which may be used in a system according to Fig. 1.
Fig. 4a shows a block diagram of a modification of the distance measuring apparatus shown in Fig. 4.
Fig. 5 shows a front view of an oscilloscope which may be used in the equipment according to Fig. 4 and illustrates the manner in which the indication of distance may be produced on such an indicator.

The described system requires the use of two separate receivers for signals received by each aerial. Fig. 4 of the drawing shows a block diagram of an equipment which may be used for this purpose. As shown in said figure, this equipment comprises two aerials which may be constituted for instance, by di-poles 2 and 2', each followed by a receiver which may comprise a detector and an amplifier indicated schematically together by a single reference numeral 3, 3' respectively and a pulser 4, 4'. The outputs of pulsers 4 and 4' of the two receivers are connected to the input of a mixer 5 followed by an Eccles-Jordan network 6 and a filter 7, this latter being connected to a galvanometric instrument with a single coil 8, the deviation of which gives the desired measure of distance.

Instead of using a pointer instrument as described hereinabove it is possible also to use a cathode ray tube or oscilloscope 10. This embodiment is shown in Fig. 4a. In this latter case, the first received signal, that is one coming from the aerial which is first touched by the rotating beam, may be used for controlling the triggering of a time base device 11 controlling the horizontal scanning system 12 of such an oscilloscope whilst the signal coming from the other antenna is adapted to control the cathode ray vertical deflection device 13 of the same.

Fig. 5 shows a front view of screen 14 of such an oscilloscope which thus forms a distance indicating dial according to the invention. As shown, screen 14 is provided following its horizontal diameter with a scale 15 graduated in units of length and namely in kilometers. This scale (as it is illustrated on Fig. 5) is adapted for indication of a distance which remains to be traveled, the first pulse being produced in correspondence with the left hand extremity of the scale and the second pulse 16 being produced at a point of the scale distance from said left hand extremity of the scale by an amount proportional to the distance traveled from the point at which two pulses are practically coincident one with the other and which in the example illustrated is a point at 18 kilometers from the point of destination corresponding to the right hand extremity of said scale.

The number of receivers may be reduced to one by using a switching arrangement permitting the commutation of cables bringing in the signals from the two aerials to a single receiver. This commutation may be controlled by the first pulse and produced for instance after a predetermined time interval after reception of said pulse. In case when the time base device is not controlled by the first pulse, it is possible to make visible on the screen of an oscilloscope simultaneously two pulses, the spacing of which will give the measure of the distance. In such a case, there will be produced at each sweep a single pulse but as a result of the persistence of luminosity of the screen, the two pulses will appear as produced simultaneously thereon.

It is easy to compute the maximum range of such an instrument, that is the distance to the farthest point at which it is possible to observe a time separation of two pulses. For this purpose, the distance to be measured will be designated by D, the spacing between the receiving aerials by b, the opening angle of the beam by $\theta$ and the ratio between the width of the received signal curve and the corresponding pulse obtained by a suitable arrangement by N.

It will be assumed also that the differentiation between the pulses on the oscilloscope is effected as soon as the middle points of said pulses are spaced by a time interval equal to the duration of said pulses.

Under these conditions, taking into account the angular width $\theta$ of the beam and the angular speed $\omega$ of its rotation, the duration of the passage of said beam by a receiving aerial will be equal to $$t = \frac{\theta}{\omega}$$

The duration of a pulse will be therefore equal to $$t' = \frac{\theta}{N\omega}$$

The spacing in relation to time of two pulses is equal to the time needed for the beam to sweep through the angle AOB or in other words:

$$t'' = \frac{d/D}{\omega}$$

If one writes $t' = t''$ then:

$$\frac{\theta}{N\omega} = \frac{d}{D\omega}$$

Hence:

$$D = \frac{d \times N}{\theta}$$

Thus taking for the spacing of two aerials 20 meters for $N=100$ and for $\theta=2°$, one obtains $$D = \frac{2.100}{0,05} = 40.000 \text{ meters}$$

This distance may be increased by increasing spacing $d$ between the two aerials, by increasing ratio N and by taking a smaller value for angle $\theta$. With high power directive aerials and very short wave lengths, it is possible to obtain easily for angle $\theta$ a value of half a degree.

It is a particularly interesting feature of this method that the measure of distance is performed with a relative precision which increases as the distance decreases as in case of moving craft when the receiving base carried by the same is approaching to a point of destination of said craft.

Figure 6:
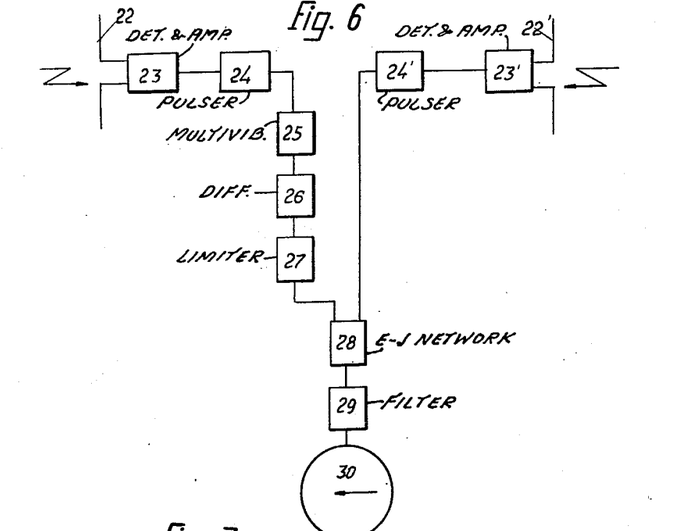
Fig. 6 shows another embodiment of distance measuring apparatus adapted for use with a rotating beam of radiant energy and which permits to obtain a zero indication for a predetermined distance from the point of origin of said beam.

Referring now to Figure 6 of the drawings, this figure relates to a modified embodiment of the invention in which a current or voltage used for producing the desired indication of distance according to the above described method is made variable with said distance, so that the same passes through a zero value for a predetermined distance between the receiving equipment and the point of origin of transmitted radiations. Thus in case of an aircraft said predetermined distance may be that corresponding to the point of landing. Such an arrangement may avoid the drawback of possible misadjustments or troubles of D. C. circuits of the equipment. More particularly it is suggested to make the indication variable with distance according to a hyperbolic law whereby thus current or voltage is made equal at the limit upon an infinite increase of the distance to a finite and a predetermined value. As shown in Fig. 6 the receiving equipment in such a case comprises as previously two receiving aerials which may be constituted by two dipoles spaced apart and placed for instance at the extremities of the wings of an aircraft.

These aerials periodically receive signals produced by the passage of the rotating beam of radiant energy through their respective points of location, this beam being supposed to rotate at an uniform speed in such a direction that it reaches first aerial 22 and then aerial 22'. The two aerials are respectively connected to detector and amplification stages indicated generally by reference numerals 23 and 23'. These stages are followed by pulser arrangements 24 and 24'. The signal pulses at the output of pulser 24 lead in relation to time the pulses appearing at the output of pulser arrangement 24' and these leading signal pulses are used for triggering a multivibrator 25 producing at its output signals of a rectangular form of duration $t_0$, $t_0$ representing, for a predetermined distance $D^1$ for which it is desired to obtain zero indication, the interval of time required for the beam to pass from one of the aerials to the other. These signals are differentiated by a differentiator arrangement indicated generally in 26, then their polarity is changed and the same are thereafter limited by means of a suitable network indicated in a general manner in 27.

In this manner signals at the output of said last stage of the receiving apparatus have a form of short duration pulses corresponding to the rear edges of signals produced by multivibrator 25. These pulses are then combined with those coming from pulser arrangement 24' corresponding to the second receiving aerial 22', at the input of a circuit system of Eccles-Jordan type indicated at 28 and which is followed by a filter 29 and a measuring apparatus 30. With an arrangement such as described above, the law of variation of the output current feeding indicator 30 as a function of the distance is of a hyperbolic form defined by the equation $$i = a \frac{D - D^1}{D}$$

It will be noted that this current for $D = D^1$ is equal to zero and at the limit when D increases infinitely it becomes equal to coefficient $a$.

From the above description, it is apparent that the invention provides thus a method whereby a dirigible craft such as an aircraft may determine its distance to a desired point, from which is transmitted a rotating beam of radiant energy, while flying toward said point or in other words, while the distance measuring base line is oriented perpendicularly and is arranged symmetrically with respect to a straight line joining the middle point of said base line to the point of origin of the rotating beam of radiant energy. Thus, the measure of a distance according to said method involves a predetermined orientation of the base line and consequently of a dirigible craft carrying the same with respect to a point in relation to which said distance is to be determined.

However, in certain instances, it may be interesting to obtain a desired indication of distance independently of a predetermined orientation of the receiving or distance measuring base line.

Accordingly the present invention concerns also an improvement of the method of distance measurement described above whereby the measure of distance between two points may be effected thus independently of the orientation of said receiving or distance measuring base line. According to this aspect of the invention, it is suggested to use at a point of reception two receiving or distance measuring base lines arranged at right angles, one to the other and each comprising two receiving aerials spaced apart and independent one from the other and to combine the effects of reception of these two systems to determine a desired measure of distance. More particularly this modified method, according to the invention, consists in measuring the angles of parallax or angles under which one sees, from the point with respect to which the distance is to be measured, the two receiving base lines formed respectively by two pairs of receiving aerials, the measures of said angles being expressed in values of electrical voltages which are combined then to determine a parallax angle of a base line of the same length placed at the same point perpendicularly to the direction passing through said points of transmission and reception.

Figure 7:
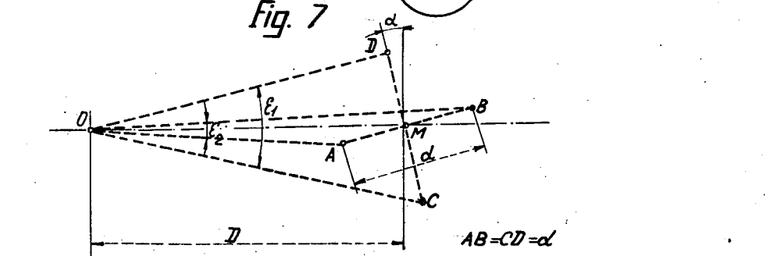
Fig. 7 is a schematic representation illustrating the use of a system of four receiving aerials forming two receiving base lines at right angles permitting to determine the distance between a point of origin of a rotating beam of radiant energy and said receiving system, independently of the orientation of said system with respect to a line joining the center of said system to the point of origin of the rotating beam.
Figure 8:
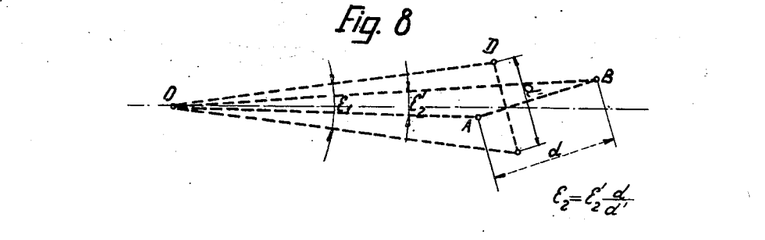
Fig. 8 shows a schematic representation illustrating the operation of another arrangement of four receiving aerials permitting to obtain a result similar to that of Fig. 7.

Referring now to Figure 7 of the drawings, there are shown four receiving aerials A, B, C, and D located at the corners of a square having its center located at point M spaced by a distance D from a point of origin O, of a rotating beam of wave energy.

The angle of parallax corresponding to a single receiving or distance measuring base line suitably oriented with respect to direction OM as shown in Figure 1 will be indicated by $\epsilon$. Then, the angles of parallax corresponding to two receiving base lines formed by two pairs of aerials AB and CD as shown on Figure 7, will be indicated by $\epsilon_1$ and $\epsilon_2$ respectively, these base lines being deviated by an angle $\alpha$ with respect to a position in which one of said base lines and namely base line AB is perpendicular to said direction OM.

Taking into account the fact that in the actual conditions of use, distance $d$ is very small when compared with distance D, one can write for the case of Figure 1:

$$\frac{\epsilon}{2} = \frac{d}{D}$$

and for the case of Figure 7:

$$\frac{\epsilon_1}{2} = \frac{d \cos \alpha}{D}$$

and $$\frac{\epsilon_2}{2} = \frac{d \sin \alpha}{D}$$

From this equation it results:

$$\sqrt{\epsilon_1^2 + \epsilon_2^2} = 2\frac{d}{D}\sqrt{\cos^2 \alpha + \sin^2 \alpha} = 2\frac{d}{D} = \epsilon$$

It appears thus that by knowing angles $\epsilon_1$ and $\epsilon_2$, it is possible to determine angle $\epsilon$ giving the measure of a distance in accordance with the equation:

$$\epsilon = k \frac{d}{D\omega}$$

where $k$ is a coefficient of proportionality.

According to the invention angles $\epsilon_1$ and $\epsilon_2$ are determined by following the method previously described, by measuring the time interval elapsing between two pulses obtained by respective passages of the rotating beam by the two aerials of each receiving base line. The indications corresponding to each base line are translated by a time measuring device known per se, into continuous current voltages capable of determining a current output proportional to values $\epsilon_1$ and $\epsilon_2$. In order to obtain $\epsilon$, it is possible for instance, to use two coils arranged at right angles and respectively traversed by currents proportional to values $\epsilon_1$ and $\epsilon_2$ and by providing inside of said coils and in inductive relation therewith a third or search coil adapted to rotate at a constant speed by a driving motor. This search coil receives by induction a voltage the tip value of which is proportional to angle $\epsilon$.

It is possible naturally to have a different length for each receiving base, that is to have $AB = d$ different from $BC = d'$ as shown in Figure 3. In such a case, the signals produced by the receiving base BC will have to be multiplied by a quantity $$\frac{d}{d'}$$

before the same are combined with those of the other base AB.

Figure 9:
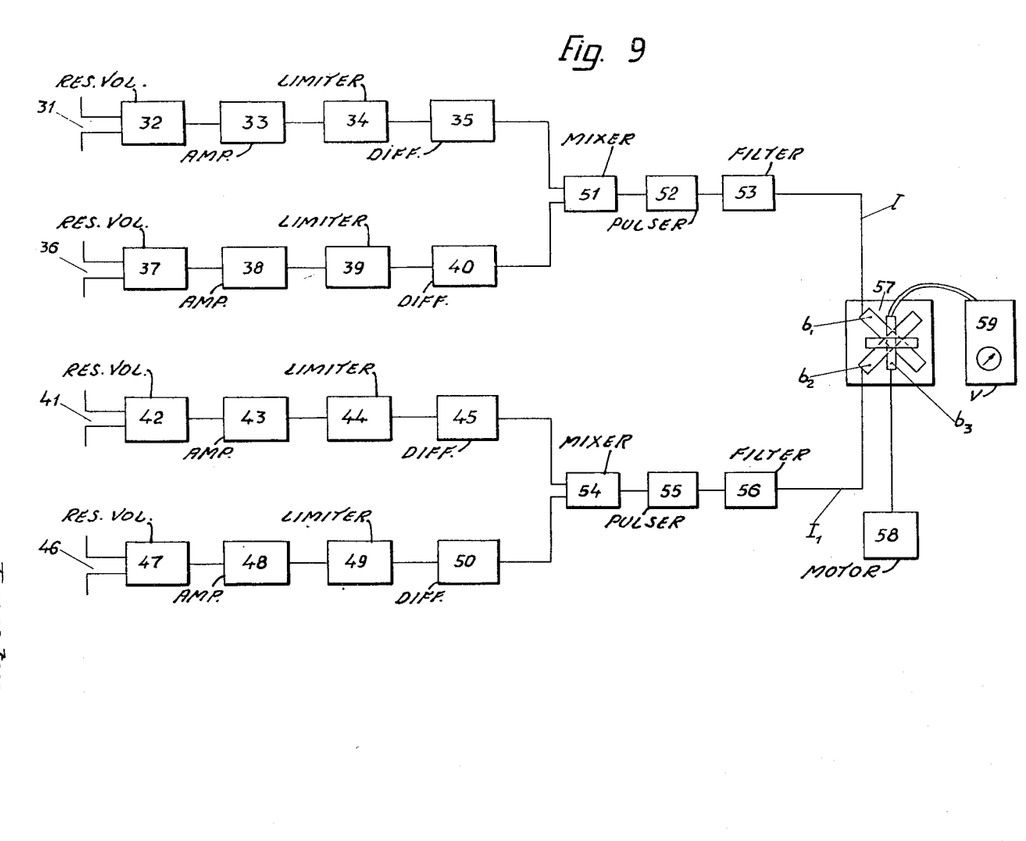
Fig. 9 is a block diagram of a distance measuring apparatus which may be used with an antenna arrangement according to Figs. 7 or 8.

Fig. 9 of the drawings shows a schematic block diagram of an apparatus or equipment which may be used for reducing to practice the above mentioned method of distance measurement.

Each receiving aerial 31, 36, 41 and 46 is associated with a suitable series of apparatus comprising respectively a resonant volume 32, 37, 42, and 47, an amplifier 33, 38, 43 and 48, a limiter arrangement 34, 39, 44 and 49, a differentiator arrangement 35, 40, 45 and 50. The two channels corresponding respectively to aerials 31 and 36 and the two channels corresponding respectively to aerials 41 and 46 are connected by pairs at their outputs, to two mixers 51 and 54 followed by pulser arrangements 52 and 55 each producing a signal of a duration equal to the time interval between the pulses produced by successive passages of the rotating beam, by two aerials corresponding to each receiving base line and two filters 53 and 56 giving place to D. C. currents proportional to the duration of pulses produced by respective pulsers. Thus currents I and I' are caused to pass through coils $b_1$ and $b_2$ arranged at right angles in a combinator system 57. A third or search coil $b_3$ provided inside said coils $b_1$ and $b_2$ is arranged to be driven by a motor 58 and acts upon a tip voltmeter 59 which may be directly graduated in units of distance.

Thus, in this arrangement whatever may be the orientation of the craft supposed to carry a two base line reception system each composed of a pair of antennae, the indication of distance between the point of intersection of the two base lines of said system and the point of origin of the rotating beam of radiant energy is indicated directly in units of distance by the deviation of an indicator such as a voltmeter 58.

Referring now to Figs. 10 to 14, the same relate to a further embodiment of the invention making use at the transmitting end of frequency modulated radiations, produced by two spaced frequency modulated transmitters operating in synchronism.

The frequency modulation preferably will be effected according to a saw teeth law, this modulation being substantially synchronously imposed on two transmitters.

Figures 10, 11:
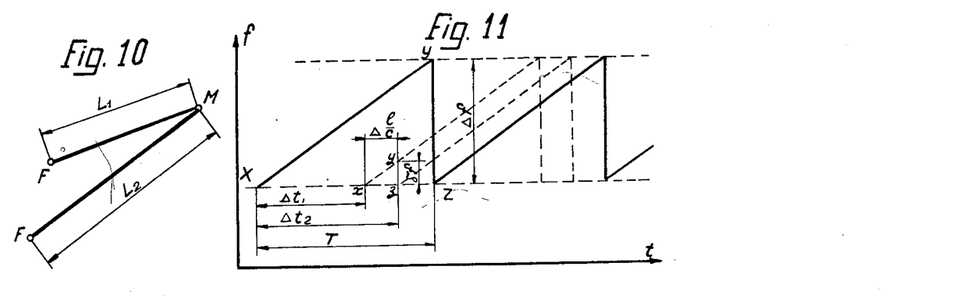
Fig. 10 is a diagram given for the purpose of illustration of another embodiment of the method according to the invention comprising the use at one point of two transmitting aerials producing frequency modulated rediations and at the other point two receiving aerials.
Fig. 11 is a diagram showing the frequency modulation applied to the two transmitting aerials of a system according to Fig. 10.

The two frequency modulated transmitters are indicated respectively on Fig. 10 at $F_1$ and $F_2$. Considering then a point of reception such as M, signals arriving at said point will have a constant frequency difference $\delta f$ due to the difference of time of travel corresponding to a difference in paths from each of said transmitters to said point of reception M. The time of travel of waves radiations will be respectively for transmitters $F_1$:

$$\Delta t_1 = \frac{D_1}{c}$$

and for transmitter $F_2$:

$$\Delta t_2 = \frac{D_2}{c}$$

Hence, the difference of times of travel of radiated waves from two receivers $F_1$ and $F_2$ to a point M is:

$$\Delta t_1 = \Delta t_2 = \frac{\Delta D}{c}$$

where $\Delta D = D_1 - D_2$.

This difference of times of travel corresponds to a difference in frequencies received at point M and which may be deduced by considering similar triangles XYZ and $xyz$ on the diagram of Fig. 7 which gives:

$$\frac{\Delta f}{T} = \frac{\delta f}{\Delta D} c$$

where $\Delta f$ is the frequency difference at point M,
$\Delta D$ is the difference in distances,
$\delta f$ is the maximum excursion of frequency of the transmitted waves,
$T$ is the modulation period, and
$c$ is the speed of light.

Figure 13:
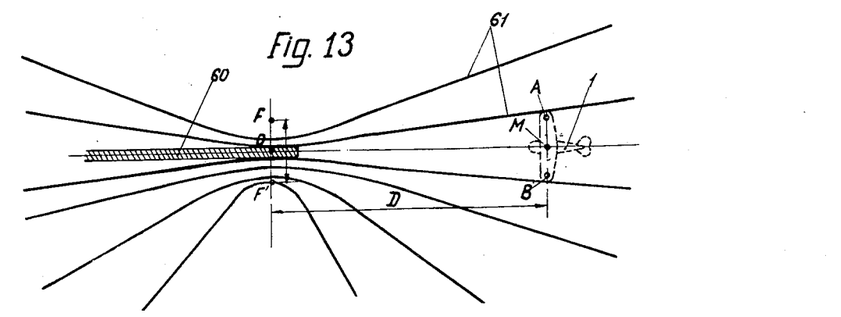
Fig. 13 is a schematic representation of the application of the embodiment of the invention to the navigation of a dirigible craft such as an aircraft toward a point of destination.

It is possible to place two antennae $F_1$ and $F_2$ symmetrically on either side of a landing runway 17 as indicated in Fig. 13, so that a perpendicular to the middle point of the base line separating transmitters $F_1$—$F_2$ coincides with the axis of the landing runway OY.

If an aircraft such as indicated in 1 on Fig. 13 has its longitudinal axis contained in the vertical plane, of said desired direction of landing, the presence of two aerials A and B located for instance at the extremities of its wings, permits to determine the distance separating said aircraft from the base line formed by the two transmitting aerials $F_1$ and $F_2$. In fact, under such conditions, it is possible to compute easily the sum of frequencies received by the two aerials A and B which represents with an approximation translated by a constant factor, the sum of differences of paths travelled by the radiations from each transmitting aerial to each of the receiving aerials A and B as appears clearly from the consideration of Fig. 12.

Figure 12:
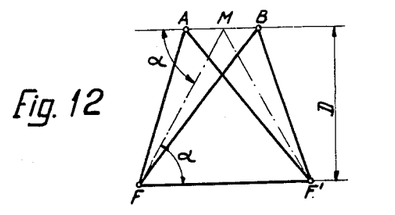
Fig. 12 is a diagram given for the explanation of the operation of said last embodiment of the invention.

By designating by $2\lambda_1$ and $2\lambda_2$ the differences of paths of travel between each of transmitters $F_1$ and $F_2$ and the two receiving aerials, by $d$ the spacing between said two receiving aerials, spacing which is relatively small in comparison with distance D, separating said receiving base line from said two transmitting aerials $F_1$ and $F_2$ forming a transmitting base line, one can write by referring to Fig. 12:

$$(AF' - AF) = 2\lambda_1$$

and $$(BF' - BF) = 2\lambda_2$$

Hence:

$$2(\lambda_1 + \lambda_2) = (AF' - AF) + (BF' - BF)$$

Aerials A and B being as previously mentioned symmetrically located on either side of axis OY, the above differences are of contrary signs and one can write:

$$2(\lambda_1 + \lambda_2) = (AF' - AF) - (BF' - BF) = (AF' - BF') + (BF - AF)$$

These last two differences are equal, therefore:

$$2(\lambda_1 + \lambda_2) = 2(BF - AF)$$

Hence:

$$\lambda_1 + \lambda_2 = BF - AF$$

If one designates then by M the middle point of the base line of the two receiving aerials A and B, and one considers the same located on the longitudinal axis of the craft, distance $d = AB$ being small in comparison with the distance MF', one can write, using the same notation as previously.

$$BF - AF = d \cos \alpha$$

Hence:

$$\lambda_1 + \lambda_2 = d \cos \alpha$$

In designating by $b$ a half distance between transmitters $F_1$ and $F_2$, distance D of the craft to the base line formed by said transmitters will be given by the equation $$D = b \, tg\alpha = b \frac{\sqrt{1 - \cos^2 \alpha}}{\cos \alpha}$$

Hence, by using the equation $\lambda_1 + \lambda_2 = d \cos \alpha$, one can write:

$$\cos \alpha = \frac{\lambda_1 + \lambda_2}{d}$$

and by designating this factor by K one obtains the following expression for distance D:

$$D = b \frac{\sqrt{1 - K^2}}{K}$$

It results that the knowledge of factor K determined by a sum of differences between received frequencies and which is thus a measurable factor permits to determine distance D.

It is possible thus to establish the following table showing the correspondence between factor K and distance D.

| Frequencies factor K= | Distance Percent D= |
|---|---|
| 0.9 | 0.5b |
| 0.8 | 0.75b |
| 0.7 | 1.3b |
| 0.6 | 1.5b |
| 0.5 | 1.7b |
| 0.4 | 2.3b |
| 0.2 | 5b |
| 0.1 | 10b |

Figure 14:
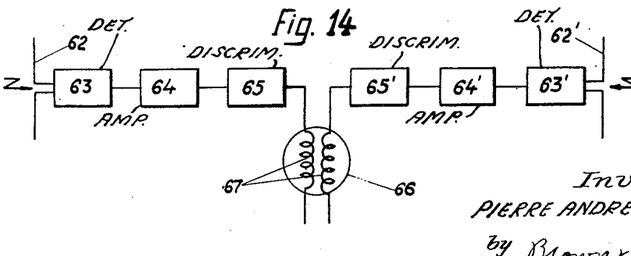
Fig. 14 is a block diagram of a distance measuring apparatus which may be used in said last embodiment of the invention.

Fig. 14 shows a block diagram of a distance measuring equipment which may be used for producing a visual and direct indication of a distance based on the above described method.

As shown in said figure, this equipment comprises two aerials corresponding to aerials A and B which may be constituted for instance by dipoles 62 and 62'. Each of said aerials is followed by a receiver which may comprise for instance a detector 63, 63', an amplifier 64, 64' and a discriminator 65, 65'. The outputs of said discriminators 65, 65' are respectively connected to two coils 66, 67 of a cross coil galvanometric indicator giving a deviation proportional to the sum of received signals, which as explained hereinabove represents with a constant factor taken into account and according to the table of correspondence indicated above, a distance between the receiving base line carried in the present instance, by an aircraft and the base line of the two transmitting aerials which may define the point of landing of the craft. The indications of distance may be produced thus directly by a needle moving over a dial graduated in units of distance.

The invention provides thus an improved method and system of distance measurement making use of a receiving distance measuring equipment comprising two aerials the effects of which are combined or compared to produce a desired indication of distance. Although several embodiments permitting to reduce to practice said method have been described and illustrated, it is to be understood that the invention is not limited to said specific embodiments but may be reproduced or applied in a different manner evident to men skilled in the art without departing from the spirit of the invention.

What is claimed is:

1. A system for distance measurement comprising means for transmitting from one location wave energy radiations presenting in azimuth a variable characteristic and means for receiving said radiations at another location for providing an indication of distance between said two locations, said latter means comprising at least two independent aerials spaced apart transversely to the direction joining said locations and means using the signals received by said two aerials to provide said indication by the difference in value of said variable characteristic of said radiations as the same are received by one and the other of said aerials.

2. A system for distance measurement comprising means for transmitting from one location wave energy radiations presenting in azimuth a characteristic variable with time and means for receiving said radiations at another location for providing a measure of distance between said two locations, said latter means comprising at least two independent aerials spaced apart transversely to the direction joining said locations and means using the signals received by said two aerials to provide said measure by the difference in value of said variable characteristic of said radiations as the same are received by one and the other of said aerials.

3. A system according to claim 2 comprising means for comparing in relation to time the effects of reception of said aerials to produce a measure of distance between said points.

4. A system for distance measurement comprising means for transmitting from one point a beam of radiant energy adapted to rotate in azimuth and means for receiving said beam at another point to provide an indication of distance between said two points, said latter means comprising at least two independent aerials spaced apart transversely to the direction joining said points and means for comparing in relation to time the equivalent instants of reception of said rotating beam by said aerials so as to provide an indication of distance as a function of time spacing of said instants of reception.

5. A system for distance measurement comprising means for transmitting from one point a beam of radiant energy adapted to rotate in azimuth and means for receiving said beam at another point to provide an indication of distance between said two points, said latter means comprising at least two independent aerials spaced apart transversely to the direction joining said points and means for combining the effects of reception of said beam by said aerials so as to provide an indication of distance by a value of a current or voltage dependent on the time spacing of equivalent instants of said effects of reception.

6. A system for distance measurement according to claim 4 comprising a cathode ray tube oscilloscope for comparing in relation to time the effects of reception of the two aerials.

7. A system for distance measurement according to claim 4 in which means for comparing in relation to time the effects of reception of the two aerials comprise a cathode ray tube oscilloscope having two cathode ray deflecting devices arranged at a right angle, a time base device adapted to control one of said deflecting devices, means for triggering said time base device by a signal produced by one of the aerials and means for controlling the other of said deflecting devices by a signal produced by the other of said aerials.

8. A system for distance measurement according to claim 4 in which means for comparing in relation to time the effects of reception of the two aerials comprise a cathode ray tube oscilloscope having horizontal and a vertical deflecting devices, a time base device adapted to control said horizontal deflecting device, means for triggering said time base device by a signal produced by one of the aerials and means for controlling the vertical deflecting device by a signal produced by the other of said aerials.

9. A system for distance measurement comprising means for transmitting from one point a beam of radiant energy adapted to rotate in azimuth and means for receiving said beam at another point to provide an indication of distance between said two points, said latter means comprising at least two independent aerials spaced apart transversely to the direction joining said points, means for indexing in relation to time signal curves of reception of said beam by said aerials, by locally produced sharply defined pulses corresponding to a point on said curves determined by a certain level of said signals, having a predetermined relation to the maximum level thereof and means for comparing in relation to time said locally produced pulses so as to provide an indication of distance by the time spacing of said pulses.

10. A system for distance measurement comprising means for transmitting from one point a beam of radiant energy adapted to rotate in azimuth and means for receiving said beam at another point to provide an indication of distance between said two points, said latter means comprising at least two spaced and independent aerials, means for indexing in relation to time signal curves of reception of said beam by said aerials by locally produced sharply defined pulses, corresponding to a point on said curves determined by a certain level of said signals, having a predetermined relation to the maximum level thereof and means for combining said locally produced pulses so as to provide an indication or measure of distance by the value of a current or voltage dependent on the time spacing of said pulses.

11. A system for distance measurement according to claim 9 comprising a cathode ray tube oscilloscope for comparing in relation to time said locally produced pulses.

12. A system for distance measurement according to claim 5 comprising means for detecting, amplifying and transforming signals induced in each aerial into pulses of short duration, time spaced one from the other proportionally to the distance between the point of location of the receiving aerials and the point of origin of the rotating beam, means for combining said spaced pulses into a current or voltage proportional to their spacing in time and means for measuring said current or voltage.

13. A system for distance measurement according to claim 5 comprising means for combining the effects of reception of the two aerials including means rendering said indicating current or voltage variable with distance so that said distance indication passes through a zero value at a predetermined distance between the transmitting and receiving points when one of said points moves toward the other.

14. A system for distance measurement according to claim 5 in which means for combining the effects of reception of the two aerials include means rendering said indicating current or voltage variable with distance according to a hyperbolic relation whereby said current or voltage takes at a limit with the distance increasing infinitely a finite and a predetermined value.

15. A system for distance measurement between two points one of which is movable toward the other, comprising at one point means for producing a beam of radiant energy adapted to rotate in azimuth and means for receiving said beam at the other point, said latter means comprising at least two independent aerials spaced apart transversely to the direction joining said points, receiver means associated with each of said aerials a multivibrator adapted to be triggered by the signal from one of the aerials for producing a signal of a rectangular form of a duration corresponding to the time interval required for the beam to pass from one to the other aerial at a predetermined distance, means for deriving from said rectangular signal a pulse corresponding to its trailing edge, an Eccles-Jordan circuit means for causing said pulse together with a signal from the other aerial to act on said Eccles-Jordan network and means for measuring the output current of said latter network.

16. A system for distance measurement comprising means for transmitting from one point radiant or wave energy presenting in azimuth a variable characteristic and means for receiving said energy at another point to provide an indication of distance between said points, said latter means comprising four independent aerials and means combining the effects of reception of said aerials to provide said indication of distance independently of the orientation of the receiving base formed by said aerials with respect to the direction joining the two distant points.

17. A system for distance measurement comprising means for transmitting from one point a beam of radiant energy adapted to rotate in azimuth and means for receiving said beam at another point for providing an indication of distance between said two points, said latter means comprising four independent aerials arranged at the extremities of two distance measuring base lines at right angle to each other, means for combining the effects of reception of two aerials forming one base line so as to obtain a voltage measuring the parallax angle of said base with respect to the point of origin of the rotating beam, means for combining in a similar manner the effects of reception of two other aerials forming the other base line and means for combining said two voltages so as to provide an indication of distance as a function of the angle of parallax of a base line of the same length as said base lines placed at the point of reception symmetrically and perpendicularly to a direction passing through said point of reception and said point of transmission of the rotating beam.

18. A system for distance measurement comprising means for transmitting synchronously related radiations presenting a variable characteristic, from two points symmetrically disposed at one location on either side of a direction joining said location with another location, and means for receiving said radiations at said other location comprising at least two spaced independent aerials also symmetrically disposed on either side of the direction joining the two locations and means for combining the effects of reception of said aerials to provide an indication of distance between said locations.

19. A system for distance measurement comprising means for transmitting synchronously related frequency modulated radiations from two points symmetrically disposed at one location on either side of a direction joining said location to another location, and means for receiving said radiations at said other location to provide an indication of distance, said latter means comprising at least two spaced independent aerials also symmetrically arranged on either side of the direction joining the two locations, means for measuring differences of frequencies received by each aerial from both transmitters simultaneously and means for adding up said frequency differences to provide an indication of distance between said two locations.

20. A system for distance measurement comprising means for transmitting synchronously related frequency modulated radiations from two points symmetrically disposed at one location on either side of a direction joining said location to another location, and means for receiving said radiations at said other location to provide an indication of distance, said latter means comprising at least two spaced independent aerials also symmetrically arranged on either side of the direction joining the two locations, means for detecting and amplifying the frequency modulated signals received by each aerial, means for transforming said signals into variable amplitude signals and means for adding up said variable amplitude signals derived from the two aerials to provide an indication of distance.

21. A system for distance measurement between a dirigible craft and a desired point on the ground comprising means at said point for transmitting variable characteristic radiations, means on the craft for receiving said radiations comprising at least two aerials placed at the opposite extremities of a base line transversal to said craft, and means for correlating the effects of reception of said radiations by said aerials, as regards to the value of said variable characteristic upon reception of said radiations by the two aerials.

PIERRE ANDRÉ PERILHOU.

References Cited in the file of this patent

UNITED STATES PATENTS

| Number | Name | Date |
| --- | --- | --- |
| 1,408,504 | Hammond et al. | Mar. 7, 1922 |
| 1,437,400 | Conners | Dec. 5, 1922 |
| 1,872,975 | Kolster | Aug. 23, 1932 |
| 1,890,786 | Johnston | Dec. 13, 1932 |
| 2,010,968 | Smith | Aug. 13, 1935 |
| 2,056,216 | Somers et al. | Oct. 6, 1936 |
| 2,070,178 | Pottenger et al. | Feb. 9, 1937 |
| 2,234,654 | Runge | Mar. 11, 1941 |
| 2,413,694 | Dingley | Jan. 7, 1947 |
| 2,423,437 | Budenbom | July 8, 1947 |
| 2,431,625 | Tolson | Nov. 25, 1947 |
| 2,451,823 | Guanella | Oct. 19, 1948 |
| 2,479,567 | Hallman | Aug. 23, 1949 |

FOREIGN PATENTS

| Number | Country | Date |
| --- | --- | --- |
| 13,924 | Great Britain | May 15, 1902 |
| 108,643 | Australia | Sept. 25, 1939 |